United States Patent Office 3,265,547
Patented August 9, 1966

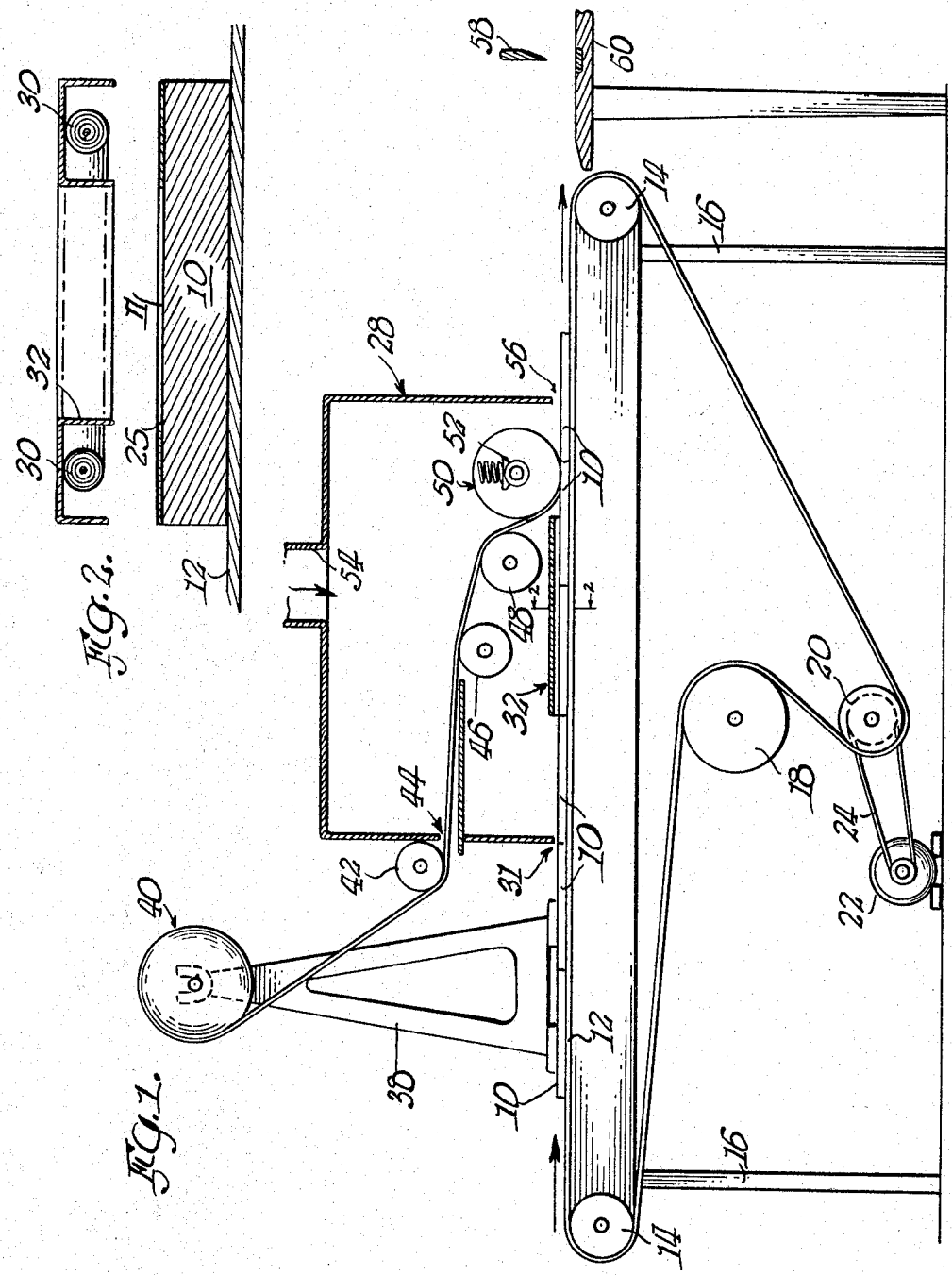

3,265,547
METHOD OF MAKING A FILM-COVERED ARTICLE
Rexford L. Selbe, Glenview, Ill., assignor to United States Gypsum Company, Chicago, Ill., a corporation of Illinois
Filed Mar. 13, 1961, Ser. No. 95,211
5 Claims. (Cl. 156—85)

This invention relates to a method of making a film-covered article and more particularly pertains to a method of peripherally applying to a rigid substrate a plastic covering which expands upon heating.

Films have been extensively used as coverings for substrates such as wall panels, acoustical and decorative tile, plywood panels, ceiling board, formboard, roof plank, etc. Such films have long been considered desirable coverings for many different materials due to their many advantageous qualities, such as washability, attractiveness and durability.

It has, however, always been extremely difficult to obtain an article having the exposed surfaces thereof covered with a taut plastic membrane having a heat-sensitive decoration embossed or etched thereon without destroying, to a large extent, the decoration during the application of the membrane to the article. Due to the destruction of the membrane decoration during its application to the substrate, it has generally been considered impractical to emboss or etch such membranes prior to such application.

In accordance with this invention, a plastic film or membrane which expands upon heating is fixedly secured in the heat-expanded condition by means of a peripheral portion thereof to a face portion of a rigid substrate. The large expanded area of the film which is unattached to the substrate, upon cooling creates a desired tautness in the film. By proper temperature control, the film may be expanded and subsequently rendered taut upon cooling without deleteriously affecting a film embossment or etching.

It is, therefore, one object of this invention to provide a method whereby a flexible film or membrane may be applied to the exposed face of a substantially inflexible substrate, without distorting or damaging the film face during application thereof to the substrate.

It is another object of this invention to provide a method of making a film-covered article which does not require complicated and expensive apparatus.

It is a further object of this invention to provide a method of making a film-covered article that utilizes less film than conventional methods used heretofore.

It is another object of this invention to provide a method of making a film-covered article having a peripherally attached taut film covering that will not wrinkle or sag when exposed to high ambient room temperatures and high humidity conditions, as will hereinafter be explained in greater detail.

Further objects and advantages will become apparent from a reading of the following detailed description when read in the light of the accompanying drawing and appended claims.

In accordance with one embodiment of this invention, a method is provided for applying a plastic film which expands upon heating to a substantially inflexible substrate. The film is applied so as to be tautly disposed on the surface of the substrate. This method includes placing the substrate on a supporting surface whereby at least the top surface of the substrate is exposed. A film that will expand upon heating is placed in registered superposed relation with respect to the top surface of the substrate. The film is heated to a sufficiently high temperature to cause it to expand, but insufficient to cause permanent distortion. The membrane is then applied to the substrate under pressure while in the heated and expanded condition. The warmed membrane is attached to peripheral edge portions of the substrate upper face by means of adhesive, and upon cooling, attempts to return to its original dimensions and thereby becomes taut on the face of the substrate.

For a more complete understanding of this invention, reference should be made to the drawing wherein:

FIGURE 1 is a schematic representation of one form of apparatus which may be employed in carrying out the process of this invention; and FIG. 2 is an enlarged sectional view illustrating the disposition of shielded heating elements relative to an underlying substrate having adhesive disposed along top peripheral edge portions thereof, taken along line 2—2 of FIG. 1.

Referring now more particularly to FIG. 1, apparatus is illustrated in a schematic manner for purposes of indicating how the process steps of this invention may be carried out. The apparatus of FIG. 1 comprises no part of this invention, and, accordingly, is not illustrated in detail.

In FIG. 1 a suitable substrate, such as a piece of plywood, gypsum board, gypsum tile, wood, mineral or vegetable fiberboard, acoustical tile, etc., is depicted moving on a continuous conveyor belt 12. For purposes of illustration, substrate 10 may comprise discrete abutting panels of gypsum board over which a plastic film or membrane is to be disposed at least on the upper face surface thereof. Conveyor belt 12 engages opposed roller members 14 which are supported by standards 16. Belt 12 engages idler roller 18, in addition to conveyor drive wheel 20, which is driven by motor 22 by means of interconnecting belt 24.

Each gypsum board 10 which is fed onto the continuous conveyor belt 12, which in the illustrated apparatus of FIG. 1 moves from left to right, is provided with an adhesive strip 25 disposed along the upper face peripheral edges thereof (see FIG. 2). In the normal course of operation of the apparatus of FIG. 1, the gypsum board having the adhesive applied to the upper peripheral edges is intermittently moved by means of belt 12 into an insulated heating chamber or oven 28 by means of opening 31 formed in one side of the oven. In the course of moving in the oven on belt 12, the gypsum board upper face peripheral edges having a heat activatable adhesive 25 disposed thereon pass beneath shielded heating elements 30 arranged in rectangular form to conform with the adhesive arrangement.

The disposition of the heating elements relative to the adhesive strips disposed on the upper face peripheral edges of the gypsum board 10 is most clearly seen from FIG. 2. It will also be seen from the latter figure that each rectangular heating element 30 is surrounded at its side and top portions by means of a shield 32. The shields direct the heat radiating from the heating elements so that the same may proceed only in a downwardly direction and activate the underlying adhesive strips 25. In an alternate method of activating the adhesive 25, the gypsum board may move continuously through the oven, and the heating element and shield reciprocally move whereby the heating element-shield assembly moves with each board over a predetermined path until the adhesive thereon is activated.

In the course of proceeding through the oven 28, the edge-coated gypsum board engages a film or membrane which is applied to the upper exposed surface of the gypsum board, that is, surface 11 as seen in FIG. 2.

In FIG. 1 a roll of plastic film 40 is mounted on a vertical support 38. The film 40 is drawn in sheet form from the roll into engagement with idler roller 42 prior to entering oven 28 by means of opening 44 disposed in one surface thereof, disposed transversely to the moving belt. The film after entry into oven 28 engages tension rollers 46 and 48, after which the distal end of the film 40 engages a rotatable pressure roller 50 which is mounted on spring-loaded bearings 52. The roller 50 is thus resiliently urged downwardly against the underlying gypsum board moving therebeneath in the normal course of rotatable movement thereof.

As the film 40 enters oven 28, it is subjected to a controlled-temperature atmosphere which may be accurately regulated by means, for instance, of air supplied at a desired temperature through duct 54. It is the function of the controlled oven temperature to expand the film 40 to a desired degree prior to engagement with pressure roller 50. The film 40, therefore, should have a positive coefficient of linear expansion whereby it expands biaxially upon being subjected to an elevated temperature.

Films suitable for utilization in the process thus far described comprise polyvinyl chloride, polyvinyl chloride acrylic alloy (by alloy is meant a mixture of polymers not chemically bound; an alloy of this type is disclosed in U. S. Patent No. 2,520,919), polyethylene, polypropylene, polystyrene, polyester and the like. The temperature within oven 28 as determined by the hot air entering duct 54, or other equivalent means, for effecting desired temperature of the film 40, should not exceed the stress relaxation or reorientation temperature of the film being applied to the substrate 10. The stress relaxation or reorientation temperature comprises that temperature which, if exceeded, results in dimensional change due to reorientation of molecules of the polymer or polymers making up the film. The reorientation temperature of a specific film is affected by manufacturing procedures and by the specific polymer or copolymers used therein. The reorientation temperature of a specific film can be empirically determined by running dimensional stability tests.

The film 40 may have embossed or etched thereon various decorative designs or may have designs imprinted thereon with various colors which are destroyed if a certain temperature is exceeded. Therefore, if the film 40 is embossed or etched, the temperature within the oven 28 should not exceed the deembossing temperature or temperature at which the design embossed on the film 40 is permanently lost. The de-embossing temperature for a particular film and embossing may also be empirically determined.

As will be apparent from FIG. 1, after the gypsum board passes from beneath heating elements 30, it will engage pressure roller 50. The roller 50 will urge the moving film 40 which is heated to a temperature beneath its reorientation temperature against the gypsum board 10. If any embossing is disposed on the film, the film will be maintained at a temperature below its de-embossing temperature, as well as its reorientation temperature.

The film 40 which is urged into engagement with the top surface of the gypsum board substrate 10 will be adhesively retained in fixed disposition on such surface by means of the rectangularly arranged heat-activated adhesive strips 25.

Upon emergence from oven 28 by means of exit opening 56, the adhesive will harden and the temperature of the film and substrate assembly will drop, tending to approach room temperature. As the temperature is decreased, the film 40 will attempt to return to its initial-area condition possessed prior to expansion which was occasioned by the temperature existing within the oven 28.

The substrate 10 upon emergence from the oven, therefore, will have tautly disposed and adhesively secured on the upper face surface 11 thereof a portion of the film 40. The film will be free of wrinkles and securely engaged to the gypsum board substrate. The gypsum board 10, although retained as an integral assembly by virtue of the continuous strip of plastic film 40, may be readily divided into a plurality of discrete tiles or other desired articles. Separation may be effected by means of a knife 58 or other equivalent means which reciprocally moves in a vertical plane in cooperation with underlying table 60 schematically illustrated in FIG. 1.

To facilitate understanding of the above-described invention, the following specific examples are presented:

A section of slotted gypsum wallboard having dimensions 2′ x 2′ x ⅜″ was placed on a continuous conveyor and a strip of heat activatable adhesive was applied to the upper face along the outer peripheral edges of the wallboard. A roll of 2 mil, 2 foot wide polyvinyl chloride-acrylic alloy embossed film was mounted on a rack above the wallboard. The conveyor passed the wallboard beneath a thermostatically controlled heating element to a point where the element completely covered the adhesive line.

The film, still suspended above the wallboard, was passed into a thermostatically controlled heating chamber. The chamber was heated to about 150° F. and thus the plastic film was similarly heated and as a result expanded. The adhesive line on the wallboard beneath the above mentioned element was heated to a temperature in the order of 350° F. The warm expanded film and substrate with activated adhesive thereon were passed simultaneously beneath a laminating pressure roller. The laminating pressure roller forced the warm expanded film onto the wallboard substrate in a manner that brought the edge of the film into intimate contact with the activated adhesive on the upper face peripheral edges of the wallboard.

The wallboard passed from the laminating roller with a wrinkle-free sheet of embossed plastic rigidly attached to the edges thereof. As the wallboard, with film thereon, cooled, the film became more taut and when the substrate was completely cool, the film was sufficiently taut that it would not sag or wrinkle when the wallboard-film assembly was suspended from a ceiling. It was noticed that the film remained smooth and taut even at elevated ambient room temperatures and under high humidity conditions.

The adhesive used to laminate the film to the substrate above described was a synthetic rubber, resin composition having methyl ethyl ketone as its solvent. The invention, however, is equally operable with a number of other adhesive formulas and it is not intended that the invention be limited to a heat activatable adhesive as above described.

In the above example, it may be noted that the film was preheated to a temperature of about 150° F. and good results were obtained with the specific film used. If another film were used, the preheat temperature would, of course, have to be varied to compensate for the properties of the given film. For example, it has been found that a biaxially oriented, clear, unembossed polystyrene film necessitated a slightly higher temperature, i.e., in the order of 155° F. Clear, unembossed polypropylene film has required slightly less heat, i.e., in the order of 135 to 145° F. Polyester film has required a temperature somewhat higher than polyvinyl chloride acrylic alloy of the example, i.e., in the order of 170° F. for optimum results. Thus, it may be seen that each film has a different reorientation temperature and de-embossing temperature which must be considered when using this method.

Although most films that expand when heat is applied are of the type that may be attached to a substrate surface by means of an adhesive, there are a number of films which do not lend themselves in a satisfactory manner to adhesive attachment. Notable examples of the latter films are the polyethylene films. It may, therefore, be necessary to peripherally attach such films by mechanical means, such as nails, staples, brads, etc., or by a hot melt. Since, as above described, the majority of films are readily applied to a given substrate by heat activatable adhesive, such method is deemed to be one of the proven means in carrying out the invention herein described.

It is apparent from the foregoing description that many changes may be effected in the above described process steps and materials used in forming a film-covered substrate. Such changes will not necessarily remove the resulting combination of steps or apparatus components from the scope of this invention. The method above described utilizes the expansion properties of certain films. By preventing heated, expanded films from returning to their initial area conditions upon cooling such films are retained in a permanently taut condition when fixedly disposed on the surface of a suitable substrate by means of an adhesive or other mechanical means in the manner above described.

As has been above pointed out, this invention utilizes films having positive coefficients of linear expansion. When employing such films, care must be exercised to insure the fact that the reorientation temperature of the film is not exceeded resulting in inability of the film to return to its initial area condition. If embossing is disposed on the film, the de-embossing temperature of such film should not be exceeded whereby the embossing of the film is destroyed. If color designs are imprinted on the film, the temperatures to which the film is exposed for purposes of expanding the film should be below that temperature at which the color imprint is destroyed.

It is intended that this invention be limited only by the scope of the appended claims.

I claim:

1. A method for applying a plastic film, which biaxially expands upon heating and having a heat-sensitive decoration formed therein, to a rigid substrate; comprising the steps of heating at least a substantial portion of said film to a temperature below that at which said heat-sensitive decoration will be destroyed and below the reorientation temperature of said film, and to a temperature sufficient to expand said film for a period of time adequate to effect biaxial expansion of said film; affixing marginal portions of said film in the expanded condition to said rigid substrate with the film portion disposed between said marginal portions unattached to said substrate whereby said film upon cooling becomes taut and is restrained from returning to its initial area possessed prior to said heating.

2. In a method for applying a plastic film, which biaxially expands upon heating and which has a decoration embossed thereon, to a rigid substrate, the steps comprising heating at least a substantial portion of said film to a temperature below its de-embossing temperature and its reorientation temperature and to a temperature sufficient to biaxially expand said film for a period of time adequate to effect expansion of said film; affixing said film in the expanded condition to said rigid substrate whereby a large expanded area of said film is unattached to said substrate, and cooling said film so that it becomes taut and is restrained from returning to its initial area possessed prior to said heating.

3. In a method for applying a plastic film which biaxially expands upon heating to a rigid building panel substrate, the steps comprising applying heat-activable adhesive to perimetric portions of said substrate, heating at least a substantial portion of said film to a temperature below its reorientation temperature and sufficient to expand said film for a period of time adequate to effect biaxial expansion of said film, activating said heat-activable adhesive, urging said film in the expanded condition and while flattened, against said substrate and the activated adhesive; the film portion disposed between the film portions engaging said adhesive being unattached to said substrate; and hardening said adhesive while said film is in the expanded state whereby said film upon cooling is restrained from returning to its initial area possessed prior to the heating thereof.

4. The method of claim 3 in which said plastic film is polystyrene and is heated to a temperature of about 155° F.

5. The method of claim 3 in which said building panel substrate is an acoustical tile.

References Cited by the Examiner
UNITED STATES PATENTS

| | | | |
|---|---|---|---|
| 2,201,706 | 5/1940 | Sukohl. | |
| 2,419,758 | 4/1947 | Borkland | 156—85 |
| 2,620,289 | 12/1952 | Douglas | 156—163 |
| 2,690,593 | 10/1954 | Abercrombie | 18—19 |
| 2,750,719 | 6/1956 | Wandelt. | |
| 2,802,764 | 8/1957 | Slayter et al. | 154—44.5 |
| 2,821,155 | 1/1958 | Seckel. | |
| 2,828,799 | 4/1958 | Harrison | 156—163 |
| 2,861,022 | 11/1958 | Lundsager | 161—402 |
| 2,877,151 | 3/1959 | Doherty et al. | 156—322 |
| 2,956,723 | 10/1960 | Tritsch. | |
| 2,966,439 | 12/1960 | Sorel. | |
| 2,989,827 | 6/1961 | Groth | 53—22 |
| 2,993,820 | 7/1961 | Marshall | 156—84 |
| 3,118,516 | 1/1964 | Fied | 181—33 |
| 3,149,018 | 9/1964 | Jacobson | 181—33 |
| 3,154,453 | 10/1964 | Demke et al. | 181—33 |

OTHER REFERENCES

Plastics Properties Chart IA, vol. 35, Modern Plastics Encyclopedia for 1957.

Modern Plastics Encyclopedia for 1959 (September 1958), pp. 156 and 448.

EARL M. BERGERT, *Primary Examiner.*

CARL F. KRAFFT, ALEXANDER WYMAN,
*Examiners.*

R. J. ROCHE, *Assistant Examiner.*